Nov. 11, 1930. F. BARTLING 1,781,659
PROCESS FOR THE THERMAL TREATMENT OF PULVERULENT MATERIAL
Filed Feb. 14, 1929
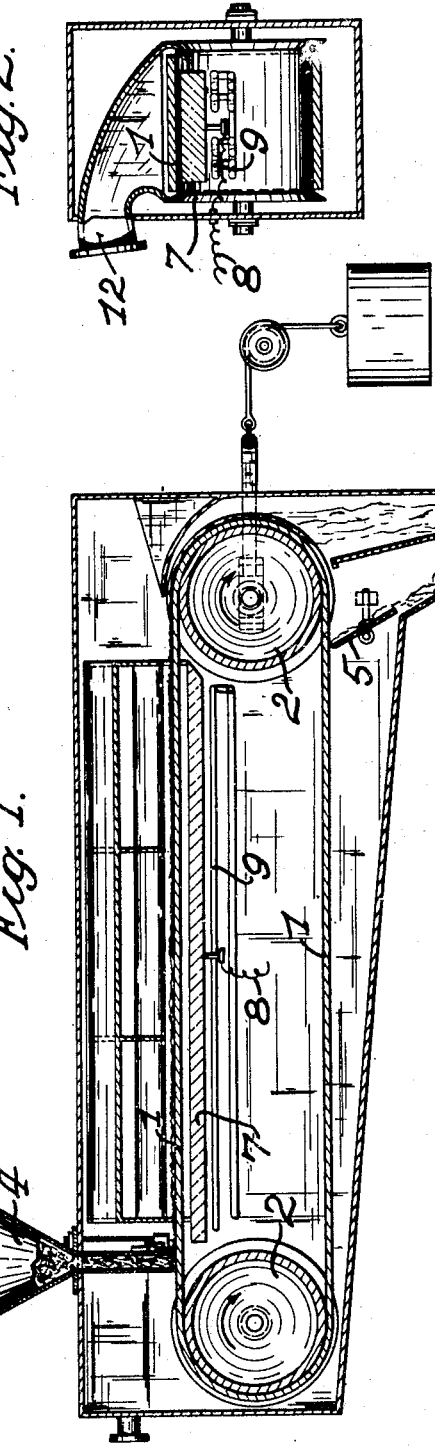
Inventor:
Friedrich Bartling,
By Sturtevant & Mason,
Attorneys.

Patented Nov. 11, 1930

1,781,659

UNITED STATES PATENT OFFICE

FRIEDRICH BARTLING, OF MUNICH, GERMANY

PROCESS FOR THE THERMAL TREATMENT OF PULVERULENT MATERIAL

Application filed February 14, 1929, Serial No. 340,004, and in Germany February 2, 1928.

The invention relates to the thermal treatment of pulverulent material, and essentially is intended to prevent, or at least appreciably to reduce, the undesirable and previously unavoidable intimate mixing of the solid product with the gasified or otherwise gaseous products.

Although the new mode of operation can be used usefully with every kind of material in the form of very fine dust, dry distillation of pulverulent materials, which plays such an important part in the industries concerned, is the primary object. As it is generally known that, for the purposes of dry distillation, the employment of bituminous material ground to the fineness of dust affords very considerable advantages over the use of granular or lumpy pieces of material, these advantages scarcely require explanation. Here, however, it is briefly stated that one appreciable advance due to working with pulverulent material resides primarily in the possibility of a continuous operation with shortest possible time of transit for complete distillation of the individual particles of the material, so that, as the heat applied can readily permeate the material, a considerable economy in heat can be effected. This gives not only an absolutely uniform product, but also very valuable oils, because it is possible to dry distill such pulverulent material, by taking suitable precautions, at much lower temperatures than previously were possible.

If the material for dry distillation has been ground to a fineness lying between a sieve mesh of 31500 per sq. in. and 64500 per sq. in., then it is possible to feed it directly and without further grinding, to the dust furnace.

Such a fuel for the dust furnace is exceedingly cheap, because the extremely valuable oils are obtained as by-product, and has in addition the great advantage of being almost entirely smokeless.

This has already been appreciated by the industries concerned, and consequently attention paid to the problem of carrying out a dry distillation process in which the material, whether coal, lignite, peat or any other known fuel, is distilled in the form of a very fine powder. It was immediately realized that it is not possible to dry distill such fine powders in the form of compact masses, and thus came the process of suspending the dust in a stream of heated gas, and thus to dry distill suspended particles. This process is, in itself, effective, but suffers from the serious drawback of all dust distillations, that the separation of the gaseous products and fuel dust cannot be effected completely and even the partial separation is attended by difficulties.

The conception underlying the present invention is that such a dust distillation process can be more effectively carried out if the pulverulent material is spread out in the thinnest possible layer on a hearth surface traveling through the distillation chamber. By this means, provided that the layer is sufficiently thin, the distillation process can be carried out very thoroughly, very uniformly and with the application of very little heat. But it is immediately clear that the defect of the process of distillation of suspended dust particles, viz. the intimate mixing of the gaseous and solid products of distillation, is likely to occur to some extent here also, and can only be avoided when it is possible to prevent any of the pulverulent material distributed over the working surface from being taken up into suspension.

The solution of this problem presented serious difficulties and the subject of the present invention is intended to constitute a means for attaining this object, but as already stated, the application of the present process is not limited to dry distillation of dust, but the basic process can also be applied to the thermal treatment of pulverulent material of every kind.

According to the invention, the solution of the particular problem set out above resides in the utilization of electrostatic adhesion.

The basic idea of the invention is the utilization of these known physical phenomena for the solution of the above problem.

Consequently the invention comprises a process for the thermal treatment of pulverulent material on a travelling working surface characterized in that the material on the working surface is held in place through the action of electric adhesion.

An arrangement for carrying out this process can be so constructed that the travelling working surface is equipped with means for imparting and maintaining a weak electric charge.

The form which the electrifying means takes is immaterial for the purposes of the present invention; for example, the travelling hearth plate may be constructed of metal and be insulated from the other parts of the furnace. A friction device, such as brushes or the like, past which the moving working surface travels, may serve to generate the weak electrostatic charge. The material is laid on the working surface in a thin layer and immediately adheres to it. The adhesion is strong enough to prevent the pulverulent material from being whirled away but is not so powerful that, at the point where the material is collected, the powder cannot be scraped off, for example by a knife of non-conducting material. This scraper device must, of course, be separated as far as possible in a dust-tight manner from the working chamber. The separation is facilitated as, due to the electric adhesion, the dust-layer still adheres to the working surface when the latter is in an inverted position. If, for example, an endless metal band carried on rollers is used as travelling hearth plate, the collecting point can be situated on the under loop of the endless band, which can readily be separated from the furnace chamber above in a dust-proof manner. It is obvious that other suitable collecting arrangements may also be utilized.

One illustrative form of an apparatus for performing such a process is set forth on the accompanying drawings, in which:

Figure 1 is a vertical sectional view through the furnace.

Fig. 2 is a transverse sectional view through the furnace.

Fig. 3 is a top plan view of the furnace.

In these drawings, the furnace chamber is provided with an endless metal conveyor band 1 passing over the two insulating drums 2, which rotate clockwise as indicated by the arrows in Fig. 1. The drums and band are caused to move by power applied at the pulley 3. A hopper 4 is arranged above the conveyor band, and through it the pulverulent material may be fed onto the metal band, being spread out in a thin layer over the band, and carried along thereon in the upper flight, and finally being discharged at the right hand end of the machine in Fig. 1, the band being utimately cleaned by a scraper 5: the separated material falls downward in a chute and is drawn off through the discharge pipe 6. Between the two drums 2 for isolating the metal band is arranged an electrically charged element 7 which is supplied with current through a wire 8, and is located directly beneath the upper flight of the band which carries the pulverulent material. The electrically charged element 7 transfers electricity to the metal band 1 and thereby causes an electric adhesion to the band of the pulverulent material spread thereon.

Heating coils 9 are provided for heating the layer of material; hot gases being fed into these heating coils 9 through the feed pipe 10, and after giving off their heat, these gases are withdrawn through the discharge pipe 11.

The heating thus effected causes a dry distillation of the particles of pulverulent dry material disposed in a thin layer upon the upper flight of the band 1, and the gases and vapor thus deposited are collected in the space above the band and are discharged through the pipes 12.

The new process can be utilized with furnaces and heating arrangements of every kind, in so far as they are provided with a travelling hearth plate, and, for example, in addition to the furnace with hearth in the form of a band as already mentioned, with rotary annular plate furnaces and similar devices.

The application of an electrostatic charge to the working hearth does not prevent the provision of devices on this latter, which by conduction and radiation transmit the requisite heat to the material to be distilled.

Claims.

1. The process for the thermal decomposition of solid carbonizable material in finely divided form, which comprises maintaining said material in surface adhesion on a moving support by an electrostatic charge thereon, and subjecting the finely divided material to destructive distillation while in adhesion to said moving support.

2. The process of distilling finely pulverulent solid carbonizable material which comprises distributing the material in a thin layer upon a traveling surface, holding said material to said surface electrostatically by an electric charge on said surface, and subjecting the material simultaneously therewith to destructive distillation while the said material is adherent to said surface.

In testimony whereof I have signed my name to this specification.

FRIEDRICH BARTLING.